June 22, 1943.    E. A. CRAWFORD    2,322,418
AUTOMATIC TEMPERATURE COMPENSATION FOR PRESSURE
INDICATORS OF CONTINUOUS ROLLING MILLS
Filed March 15, 1941    2 Sheets-Sheet 1
FIG.1.
FIG.2.
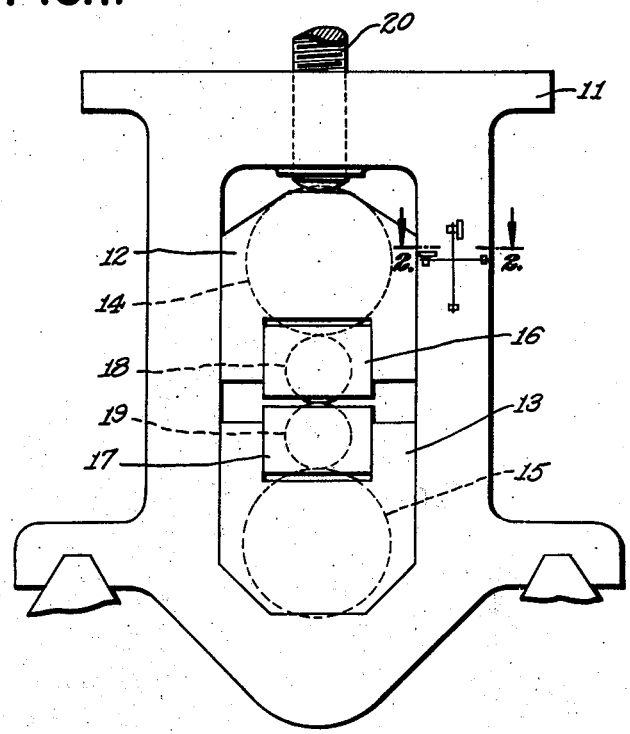
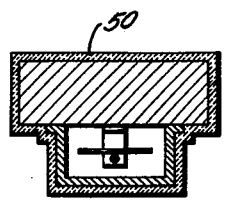
FIG.3.
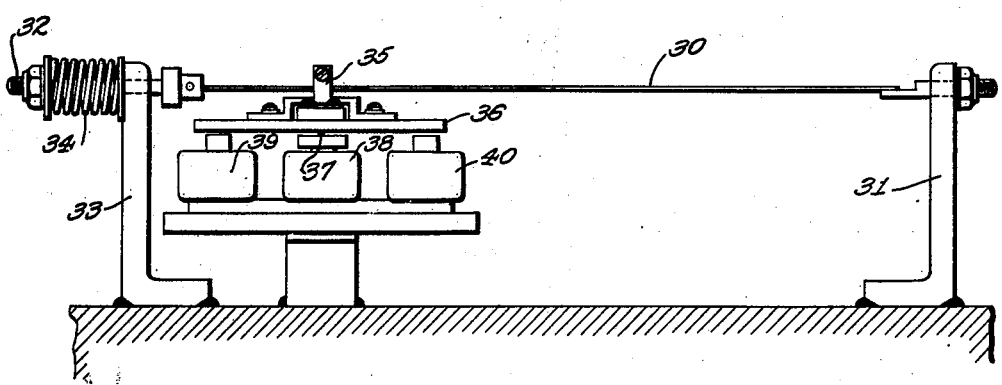
INVENTOR.
ERNEST A. CRAWFORD
BY Joseph H. Lipschutz
ATTORNEY.

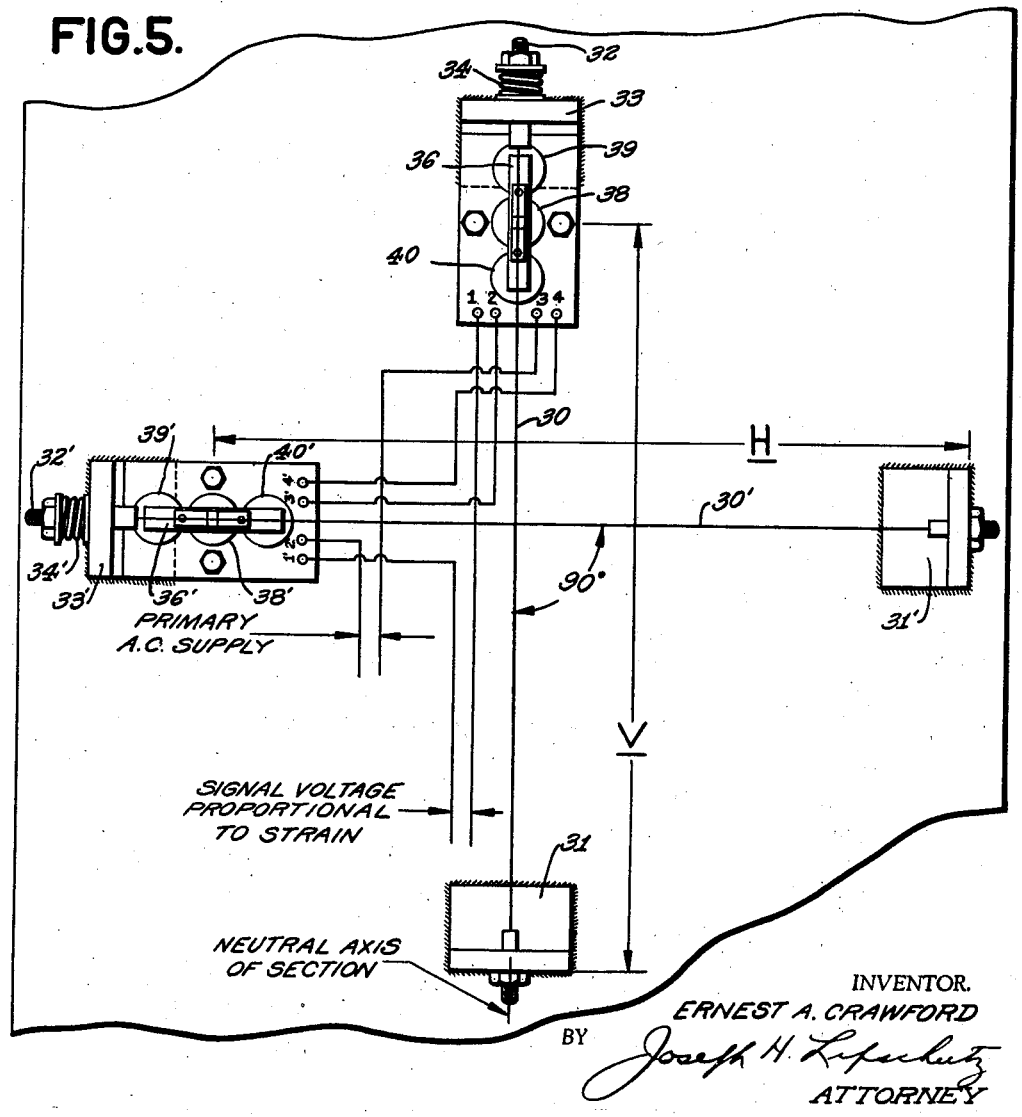

Patented June 22, 1943

2,322,418

UNITED STATES PATENT OFFICE 2,322,418

AUTOMATIC TEMPERATURE COMPENSATION FOR PRESSURE INDICATORS OF CONTINUOUS ROLLING MILLS

Ernest A. Crawford, Chicago, Ill., assignor to Sperry Products, Inc., Hoboken, N. J., a corporation of New York Application March 15, 1941, Serial No. 383,580

3 Claims. (Cl. 265—1)

This invention relates to instruments or devices for the precise measurement of strain or pressure as it appears in a structural member and manifests itself in the deflection of such member. More particularly, this invention is adapted to be applied to a pressure indicator for measuring the pressures which are maintained between the rolls of a rolling mill, especially of the continuous hot strip type wherein a slab of metal which has been heated to high temperature is moved by conveyors successively to a plurality of work mill stands through which the metal passes under considerable pressure to thin out the same until finally it emerges as a relatively thin continuous strip of substantial length. Each mill stand comprises spaced bearing end frames in which the rolls are mounted, and in modern practice these mills are "Four-high" type wherein two intermediate pressure rolls are supported between two heavy back-up rolls.

The passage of the material through such mill stand causes distortion of the end frames, and the greater the pressure the greater will be the distortion. A suitable device for measuring such distortion is disclosed in the copending application of Alexander Shayne and Alexander Zeitlin, Serial No. 384,212, for Strain gauge for rolling mills and the like, filed March 19, 1941, in which a sensitive element in the form of a wire filament is mounted on the neutral bending axis of the vertical portion of the frame, said filament being fixed at one end to the frame and relatively movable at the other, so that upon distortion of the frame due to pressure the filament will move. Such movement is caused to transmit an electromotive force proportional to the degree of movement. It will be understood that even under the great loads which are present in such rolling mills, amounting in some instances to several million pounds, the distortion of the frame will be of a very small order, of perhaps a thousandth of an inch or less. If now it is borne in mind that in a hot strip mill metal of temperatures of 1500° F. or more is passing through the mill stands, it will immediately become apparent that the factor of temperature and its effect upon both the mill stand frames and the strain responsive members will be vital. This is particularly true in view of the fact that the responsive element is of exceedingly small mass, while the mill stand frame on which it is mounted and whose distortion it is adapted to measure is a large mass.

It is the principal object of my invention therefore to provide means whereby the effect of temperature on the mill stand frame which would ordinarily cause the sensitive element to transmit an E. M. F. in the same manner as for strain due to pressure between the rolls, will be nullified so that any impulses transmitted by the responsive element will be due solely to strain caused by pressure between the rolls.

Further objects and advantages of this invention will become apparent in the following detailed description thereof.

In the accompanying drawings,

Fig. 1 is a side elevation of one of the two spaced bearing frames of a rolling mill stand showing the positioning of the pressure responsive sensitive elements thereon and having my invention applied thereto.

Fig. 2 is a section taken substantially on the line 2—2 of Fig. 1.

Fig. 3 is a front elevation of one of the transformers employed in Fig. 5.

Fig. 4 is a detail of the wiring connections to one transformer employed in Fig. 5.

Fig. 5 is a wiring diagram of this invention.

While this invention has more general application, as will be apparent from this description, it is described herein as applied to pressure indicators for use in hot strip continuous rolling mills. Such mill usually comprises ten mill stands arranged in line. A slab of metal is discharged from the furnace onto a conveyor and is passed successively through the rolling mill stands, being reduced in thickness and lengthened until the material which was discharged from the furnace as a relatively small thick slab, comes out of No. 10 mill stand as a thin sheet of perhaps a thousand feet in length and travelling at speeds of 1000 to 1500 feet a minute. Each stand in succession applies much pressure to the material passing through it, of the order of several million pounds, and, naturally, all of the parts of the mill stand including the bearings and the mill frame, are subjected to great strain. The desirability of measuring the pressures during the passage of the material through the rolls is therefore apparent, not only for the protection of the mill stands and the rolls, but also in order that the thickness of the material may be controlled since the thickness is a direct function of the pressure applied to the rolls. Each said frame 11 of the four-high rolling mill stand has a central cutout portion within which are located bearing blocks 12 and 13 in which the heavy back-up rolls 14 and 15 are journaled. Within the blocks 12 and 13 are smaller blocks 16 and 17 containing the bearings for the working rolls 18 and 19. These working rolls are driven in opposite directions by a powerful gear connected motor, not shown, and the material to be rolled passes between them. The back-up rolls 14 and 15 have for their purpose the prevention of undue deflection or breakage of the working rolls and are accordingly made much heavier. A large screw 20 bears down on the top of block 12 to exert pressure against the bearings of the back-up rolls which in turn force the work rolls together. The screw 20 is therefore a means by which varying pressures may be applied to the material while it is being rolled. This pressure causes the material to decrease in thickness and as it passes successively through the several rolling mill stands it will finally become the thin long ribbon mentioned hereinbefore, the thickness of which is determined directly by the pressure applied while it passes through the rolls.

The importance of measuring the pressure existing between the rolls is apparent since it is only with this knowledge that the thickness of the material can be controlled. One method of measuring such pressure is disclosed in the said copending application of Alexander Shayne and Alexander Zeitlin and is based upon a realization of the fact that when pressure exists between the rolls the upright portions of the mill frame are subjected to tension and will increase in length in direct proportion to the load. They therefore proposed to mount on the said upright portion of the frame a wire filament 30 fixedly connected at one end to a bracket 31 which in turn is fixedly attached to the frame. At its other end the filament is movably connected to the frame by having said end fastened to a member 32 which is movably connected to bracket 33, fixed to the upright portion of the frame, by means of a spring 34. Said filament 30 is connected at a point adjacent its movable end to an arm 35 on a lever 36 pivoted at its mid-point at 37 to form the armature of an energy transmitter comprising a plurality of coils 38, 39 and 40. The coil 38 is a primary coil which may be energized from a suitable source such as an A. C. supply to induce voltages in the coils 39 and 40 which, however, are oppositely connected so that when said armature is in mid-position no energy is transmitted. When, however, the upright portion of the frame stretches, the movable end 32 of the filament 30 is caused to move relative to said frame and therefore tilts the armature 36 to increase the air gap between said armature and one of said coils 39 and 40 and decrease the gap between said armature and the other of said coils. Unequal voltages will thus be generated in said coils and the differential of said voltages will be used to control the power output of any suitable thermionic amplifier to operate a suitable indicator such as that shown in the said Shayne and Zeitlin copending application.

From the above description it will be apparent that the filament 30 responds to elongation of the vertical portion of frame 11, and if such elongation were the result only of pressure between the rolls there would be no difficulty encountered. However, the temperature of the mill stands changes during the rolling operation because of the high temperature of the material passing therethrough, the varying temperature in the building which houses the continuous mill, mechanical working of the roll bearings, and the cooling water sprayed on the rolls. The net effect of such temperature changes on the vertical columns will be to cause variations in the length of said column in a manner similar to the variation in length caused by the varying pressures existing between the rolling mills. These errors may be very substantial and may cause the material to be rolled with errors in thickness far beyond the allowable limits. In order that the pressure gauge may correctly indicate pressure existing between the rolls without the error of temperature effect on the vertical columns of the mill stand, I provide means for counteracting said temperature effect continuously, in the interval when the material is being rolled as well as in the interval when no material is passing through the mill stand. To accomplish the above purpose, I provide a substantial duplicate of the responsive elements 30–34 inclusive, but instead of positioning the responsive element in the vertical axis of the mill stand column, I position the same on an axis transverse thereto. As the column stretches, the cross-section of this portion of the column diminishes. The duplicate elements are indicated by the same numerals primed. It will be seen that the element 30 will be affected by stretching of the column lengthwise in response to pressure between the rolls and also in response to temperature change. The element 30' will be responsive to stretching of the column due to pressure between the rolls indirectly due to the diminution in cross-section, and this response will be in an opposite direction to the response of element 30; for whereas the portion of the frame with which element 30 cooperates elongates in response to stretch, the portion of the frame with which element 30' cooperates is reduced in response to stretch. Element 30' will however be responsive to increase in dimension of the column along the axis of element 30' in response to temperature changes in the same sense as element 30, since temperature change, unlike stretching, causes the portions of the frame with which both elements cooperate to increase in dimension. If the output of the energy transformer 40' can be opposed electrically to the output of transformer 40, then it will be seen that the effect of temperature on the element 30 is wiped out by reason of the fact that the effect of temperature on the element 30 is equal and opposite to the effect of temperature on element 30'. Thus if the effect of temperature on element 30 is T, and the effect of temperature on element 30' is T', and since $T=T'$, then by opposing them, $T-T'=0$. The effect of strain or stretching due to pressure between the rolls is amplified by opposing the outputs of transformers 40 and 40'. The reason for this is that the response of element 30' to stress is opposite in sign to the response of element 30. Thus, if the response of element 30 to stress is S, then the response of element 30' is, as hereinbefore explained, $-S'$. If these are opposed, then $S-(-S')=S+S'$. The result therefore is a greater output in response to stress while nullifying the outputs in response to temperature variation.

In order that the above may be true, element 30' must be of the same length and material as element 30. If desired, element 30' may be of a different length from element 30 but in that case the different lengths must be compensated for by changing the leverage connections between the filaments and the armatures by varying the length of the fulcrum arms to give the necessary lever arm multiplication so that a movement of armature 36' may be obtained to that of armature 36.

Referring to Fig. 4, it will be seen that each energy or voltage generating member consists of the three coils as shown where power from a suitable source such as A. C. supply may be furnished to terminals 2 and 3 of the central coil 38, while the differential E. M. F. between coils 39 and 40 are taken out at terminals 1 and 4.

Referring to Fig. 5, it will be seen how I have connected the two transformers so that their outputs are in opposition. The A. C. supply energizes coils 38' and 38 by way of terminals 2', 3', 2 and 3, but the output of the transformers extends from lead 1' to lead 4' and thence to lead 4 and lead 1, so that it is clear that the output of unit 40' is in opposition to the output of unit 40. The net signal voltage is the result only of strain due to pressure between the rolls.

Temperature also causes the rolls themselves to expand and therefore the distance between the rolls is lessened and the pressure upon the material passing between them is increased. This temperature effect, however, is not one which it is desired to counteract, because this temperature effect actually increases the pressure between the rolls, and the total pressure between the rolls from whatever source is the factor which the pressure indicator must indicate. It is only such temperature effect as that which acts on the vertical column of the bearing frame, and which does not result in increased pressure, that it is the function of this invention to eliminate. In order that the responsive members 30 and 30' shall partake of the temperature of the portion of the mill stand with which each cooperates and shall not be affected by the temperature of the surrounding atmosphere to any appreciable extent, the said portion of the mill stand with which said elements 30 and 30' cooperate, as well as the elements themselves and the transformers 40 and 40' are all enclosed within a heat insulating casing 50.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A device for measuring the variations in stress in a rolling mill frame which is adapted to stretch lengthwise and narrow crosswise in response to pressure between the rolls, said device comprising a pair of members mounted on said frame and adapted to be responsive to variations in temperature of said frame, one of said members being positioned so as to respond to stretching of said frame while the other of said members is positioned so as to respond to narrowing of said frame, the responses of said members due to stretching and narrowing of the frame being of opposite sign while the responses of said members due to temperature variations of said frame are of the same sign, means whereby the responses of said members are arranged in opposition, whereby the responses of said members due to stretching and narrowing of said frame will be additive while the responses of said members due to temperature variations will tend to cancel each other.

2. A device for measuring the variations in stress in a rolling mill frame which is adapted to stretch lengthwise and narrow crosswise in response to pressure between the rolls, said device comprising a pair of members mounted on said frame and adapted to be responsive to variations in temperature of said frame, one of said members being positioned lengthwise so as to respond to stretching of said frame while the other of said members is positioned crosswise so as to respond to narrowing of said frame, the responses of said members due to stretching and narrowing of the frame being of opposite sign while the responses of said members due to temperature variations of said frame are of the same sign, means whereby the responses of said members are arranged in opposition, whereby the responses of said members due to stretching and narrowing of said frame will be additive while the responses of said members due to temperature variations will tend to cancel each other.

3. A device for measuring the variations in stress in a rolling mill frame which is adapted to stretch lengthwise and narrow crosswise in response to pressure between the rolls, said device comprising a pair of members mounted on said frame and adapted to be responsive to variations in temperature of said frame, each of said members comprising a filament fixed to said frame at one end and having its other end movable, one of said members being positioned so as to respond to stretching of said frame while the other of said members is positioned so as to respond to narrowing of said frame, the responses of said members due to stretching and narrowing of the frame being of opposite sign while the responses of said members due to temperature variations of said frame are of the same sign, means whereby the responses of said members are arranged in opposition, whereby the responses of said members due to stretching and narrowing of said frame will be additive while the responses of said members due to temperature variations will tend to cancel each other.

ERNEST A. CRAWFORD.